(12) United States Patent
Sahara et al.

(10) Patent No.: US 12,204,013 B2
(45) Date of Patent: Jan. 21, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Tooru Sahara, Yokohama (JP); Takuya Homma, Yokohama (JP); Masayuki Sato, Yokohama (JP); Youhei Murakami, Yokohama (JP); Masamitsu Nishikido, Yokohama (JP); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 337 days.

(21) Appl. No.: 17/755,085

(22) PCT Filed: Oct. 9, 2020

(86) PCT No.: PCT/JP2020/038281
§ 371 (c)(1),
(2) Date: Apr. 20, 2022

(87) PCT Pub. No.: WO2021/085083
PCT Pub. Date: May 6, 2021

(65) Prior Publication Data
US 2022/0291372 A1 Sep. 15, 2022

(30) Foreign Application Priority Data
Oct. 29, 2019 (JP) .................................. 2019-196747

(51) Int. Cl.
*G01S 13/56* (2006.01)
*G01S 13/536* (2006.01)
*G01S 13/931* (2020.01)

(52) U.S. Cl.
CPC ............ *G01S 13/56* (2013.01); *G01S 13/536* (2013.01); *G01S 13/931* (2013.01)

(58) Field of Classification Search
CPC ....... G01S 13/56; G01S 13/536; G01S 13/931
(Continued)

(56) References Cited

U.S. PATENT DOCUMENTS 6,140,954 A 10/2000 Sugawara et al.
9,297,886 B1\* 3/2016 Mountcastle ........... G01S 13/52
(Continued)

FOREIGN PATENT DOCUMENTS

DE 10 2015 118 957 A1 5/2017
EP 2 952 926 A1 12/2015
(Continued)

*Primary Examiner* — James R Hulka
*Assistant Examiner* — Samarina Makhdoom
(74) *Attorney, Agent, or Firm* — Studebaker & Brackett PC

(57) ABSTRACT

An electronic device includes a transmission antenna that transmits a transmission wave, a reception antenna that receives a reflected wave that is the transmission wave having been reflected, and a control unit that detects a target by using a constant false alarm rate on the basis of a transmission signal transmitted as the transmission wave and a reception signal received as the reflected wave. The control unit performs control to skip processing of detecting an object determined to be a stationary object among objects located around the electronic device, as the target by using the constant false alarm rate on the basis of the transmission signal and the reception signal.

13 Claims, 10 Drawing Sheets

(58) Field of Classification Search
USPC .......................................................... 342/93
See application file for complete search history.

(56) References Cited

U.S. PATENT DOCUMENTS

| | | | |
|---|---|---|---|
| 10,054,671 | B2 | 8/2018 | Satou et al. |
| 2011/0025546 | A1* | 2/2011 | Cook .................... G01S 7/2923 |
| | | | 342/162 |
| 2014/0240167 | A1 | 8/2014 | Cho |
| 2015/0323649 | A1 | 11/2015 | Lee et al. |
| 2015/0338513 | A1 | 11/2015 | Moon et al. |
| 2016/0334512 | A1 | 11/2016 | Borgonovo et al. |
| 2017/0261600 | A1* | 9/2017 | Maennicke ........... G01S 7/4026 |
| 2018/0143295 | A1* | 5/2018 | Crane .................... G01S 7/415 |
| 2018/0364327 | A1* | 12/2018 | Weldum .................. G01S 7/414 |

FOREIGN PATENT DOCUMENTS

| | | |
|---|---|---|
| EP | 3 683 596 A1 | 7/2020 |
| JP | H11-211811 A | 8/1999 |
| JP | 2014-153256 A | 8/2014 |

\* cited by examiner

V (VELOCITY OF VEHICLE OF INTEREST)

ELECTRONIC DEVICE, METHOD FOR CONTROLLING ELECTRONIC DEVICE, AND PROGRAM

CROSS-REFERENCE TO RELATED APPLICATIONS

This application claims priority from Japanese Patent Application No. 2019-196747 filed in Japan on Oct. 29, 2019, the entire disclosure of which is incorporated herein by reference.

TECHNICAL FIELD

The present disclosure relates to an electronic device, a method for controlling an electronic device, and a program.

BACKGROUND ART

For example, in fields such as automobile-related industries, a technology for measuring a distance or the like between a vehicle of interest and a predetermined object is regarded as important. Recently, various studies have been conducted particularly on a radar (Radio Detecting and Ranging) technology for measuring a distance or the like to an object such as an obstacle by transmitting a radio wave such as a millimeter wave and by receiving a reflected wave reflected off the object. Such a technology for measuring a distance or the like expectedly becomes more important in the future with progresses of a technology for assisting drivers in driving and an automated-driving-related technology for partially or entirely automating driving.

Various suggestions have been made in relation to a technology for detecting the presence of a predetermined object by receiving a reflected wave of a radio wave that has been transmitted and reflected off the object. For example, PTL 1 discloses a radar device that, when the number of observation points serving as a candidate for a stationary object such as a wall reaches a predetermined specified value, calculates an azimuth of the stationary object such as the wall.

CITATION LIST

Patent Literature

PTL 1: Japanese Unexamined Patent Application Publication No. 2014-153256

SUMMARY OF INVENTION

In one embodiment, an electronic device includes a transmission antenna that transmits a transmission wave, a reception antenna that receives a reflected wave that is the transmission wave having been reflected, and a control unit.

The control unit detects a target by using a constant false alarm rate on the basis of a transmission signal transmitted as the transmission wave and a reception signal received as the reflected wave.

The control unit performs control to skip processing of detecting an object determined to be a stationary object among objects located around the electronic device, as the target by using the constant false alarm rate on the basis of the transmission signal and the reception signal.

In one embodiment, a method for controlling an electronic device includes a step of transmitting a transmission wave from a transmission antenna, a step of receiving, from a reception antenna, a reflected wave that is the transmission wave having been reflected, and a step of detecting a target by using a constant false alarm rate on the basis of a transmission signal transmitted as the transmission wave and a reception signal received as the reflected wave.

In the control method, in the step of detecting, control is performed to skip processing of detecting an object determined to be a stationary object among objects located around the electronic device, as the target by using the constant false alarm rate on the basis of the transmission signal and the reception signal.

In one embodiment, a program causes an electronic device to execute a step of transmitting a transmission wave from a transmission antenna, a step of receiving, from a reception antenna, a reflected wave that is the transmission wave having been reflected, and a step of detecting a target by using a constant false alarm rate on the basis of a transmission signal transmitted as the transmission wave and a reception signal received as the reflected wave.

In the program, in the step of detecting, control is performed to skip processing of detecting an object determined to be a stationary object among objects located around the electronic device, as the target by using the constant false alarm rate on the basis of the transmission signal and the reception signal.

DESCRIPTION OF EMBODIMENTS

Figure 1:
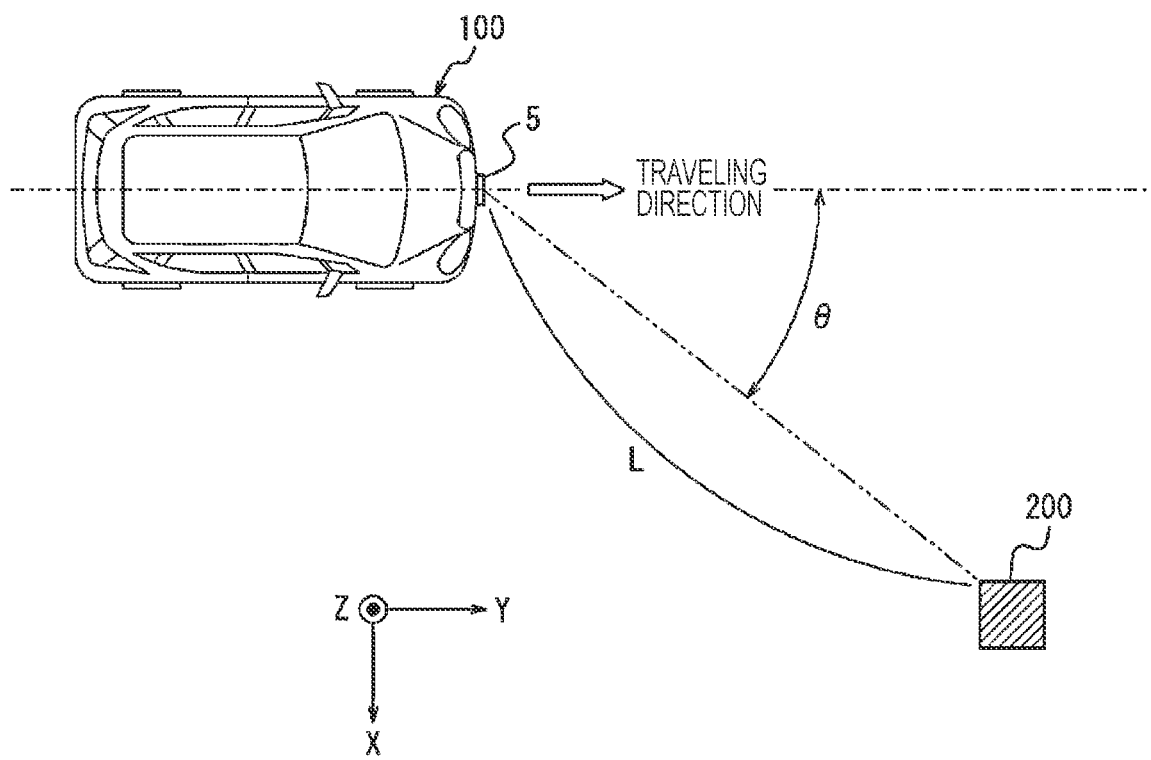
FIG. 1 is a diagram for describing how an electronic device according to one embodiment is used.

The processing load of detecting a target is desirably reduced in a technology for detecting a predetermined object by receiving a reflected wave that is a transmitted transmission wave reflected off the object as in the radar described above. An object of the present disclosure is to provide an electronic device, a method for controlling an electronic device, and a program that can reduce the processing load of detecting a target. According to one embodiment, an electronic device, a method for controlling an electronic device, and a program that can reduce the processing load of detecting a target can be provided. One embodiment is described in detail below with reference to the drawings.

An electronic device according to one embodiment is mounted in a vehicle (mobility device) such as an automobile, for example, and thus is capable of detecting, as a target, a predetermined object located around the mobility device. Therefore, the electronic device according to the one embodiment is capable of transmitting a transmission wave to an area around the mobility device from a transmission antenna installed on the mobility device. The electronic device according to the one embodiment is also capable of receiving a reflected wave that is the reflected transmission wave, from a reception antenna installed on the mobility device. At least one of the transmission antenna and the reception antenna may be included in a radar sensor or the like installed on the mobility device, for example.

A configuration in which the electronic device according to the one embodiment is mounted in an automobile such as a passenger car is described below as a typical example. However, the mobility device in which the electronic device according to the one embodiment is mounted is not limited to an automobile. The electronic device according to the one embodiment may be mounted in various mobility devices such as an autonomous car, a bus, a truck, a taxi, a motorcycle, a bicycle, a ship, an aircraft, a farm vehicle such as a tractor, a snowplow, a garbage truck, a police car, an ambulance, a fire engine, a helicopter, and a drone. The mobility device in which the electronic device according to the one embodiment is mounted is not necessarily limited also to a mobility device that moves by its own motive power. For example, the mobility device in which the electronic device according to the one embodiment is mounted may be a trailer towed by a tractor. The electronic device according to the one embodiment is capable of measuring a distance or the like between the sensor and a predetermined object when at least one of the sensor and the object is movable. The electronic device according to the one embodiment is also capable of measuring the distance or the like between the sensor and the object even when both the sensor and the object are stationary. The automobile encompassed by the present disclosure is not limited by the overall length, the overall width, the overall height, the displacement, the seating capacity, the load, or the like. For example, the automobile of the present disclosure includes an automobile having a displacement greater than 660 cc and an automobile having a displacement less than or equal to 660 cc that is a so-called light automobile. The automobile encompassed by the present disclosure is not limited to so-called gasoline-fueled cars. The automobile of the present disclosure includes an automobile that partially or entirely uses electricity as energy and uses motive power of a motor.

An example of how the electronic device according to the one embodiment detects an object is described first.

FIG. 1 is a diagram for describing how the electronic device according to the one embodiment is used. FIG. 1 illustrates an example in which a sensor including a transmission antenna and a reception antenna according to the one embodiment is installed on a mobility device.

A sensor 5 including a transmission antenna and a reception antenna according to the one embodiment is installed on a mobility device 100 illustrated in FIG. 1. It is assumed that an electronic device 1 according to the one embodiment is also mounted (for example, built) in the mobility device 100 illustrated in FIG. 1. A specific configuration of the electronic device 1 is described later. The sensor 5 may include at least one of the transmission antenna and the reception antenna, for example. The sensor 5 may also appropriately include at least any of other functional units, such as at least part of a control unit 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) illustrated in FIG. 1 or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or at a rear portion of the mobility device 100. The number of such sensors 5 may be any number equal to or greater than 1 depending on various conditions (or requirements) such as a range and/or an accuracy of measurement performed at the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object as the target.

The sensor 5 including the transmission antenna may be typically a radar (Radio Detecting and Ranging) sensor that transmits and receives a radio wave. However, the sensor 5 is not limited to a radar sensor. The sensor 5 according to the one embodiment may be, for example, a sensor based on the LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect, as the target, the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival θ) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, other forms of life such as an animal or an insect, a guardrail, a median strip, a road sign, a step on a sidewalk, a wall, a manhole, a structure such as a house, a building, or a bridge, or an obstacle. The object 200 may be in motion or stationary. For example, the object 200 may be an automobile or the like that is parked or stationary around the mobility device 100. In addition, the object 200 may be located not only on a road but also at an appropriate place such as on a sidewalk, in a farm, on a farmland, in a parking lot, in a vacant lot, in a space on a road, in a store, at a crossing, on the water, in the air, in a gutter, in a river, in another mobility device, in a building, inside or outside of other structures. In the present disclosure, the object detected by the sensor 5 includes living things such as a person, a dog, a cat, a horse, and other animals in addition to non-living things. The object detected by the sensor 5 in the present disclosure includes a target, which includes a person, an object, and an animal, to be detected with the radar technology.

In FIG. 1, a ratio between a size of the sensor 5 and a size of the mobility device 100 does not necessarily indicate an actual ratio. FIG. 1 illustrates the sensor 5 that is installed on an outer portion of the mobility device 100. However, in the one embodiment, the sensor 5 may be installed at various positions of the mobility device 100. For example, in one embodiment, the sensor 5 may be installed inside a bumper of the mobility device 100 so as not to be seen in the appearance of the mobility device 100. In addition, the position where the sensor 5 is installed in the mobility device 100 may be either outside or inside of the mobility device 100. The inside of the mobility device 100 may refer to, for example, inside of the body of the mobility device 100, inside of the bumper, inside of a headlight, a space in the mobility device 100, or any combination of these.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
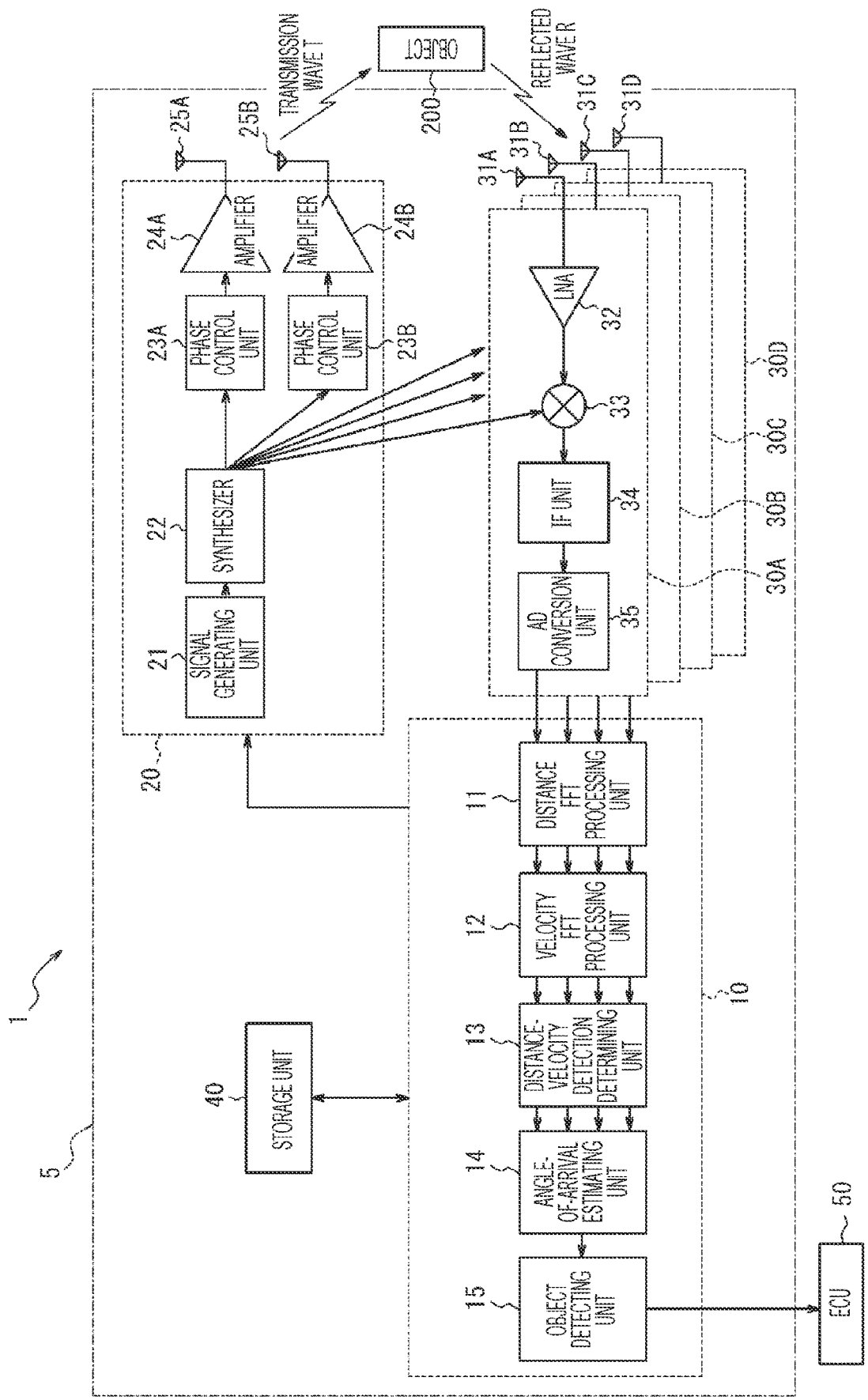
FIG. 2 is a functional block diagram schematically illustrating a configuration of the electronic device according to the one embodiment.

FIG. 2 is a functional block diagram schematically illustrating an example of a configuration of the electronic device 1 according to the one embodiment. An example of the configuration of the electronic device 1 according to the one embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency bandwidth of 79 GHz has a characteristic that the usable frequency bandwidth is wider than that of another millimeter-wave and/or quasi-millimeter-wave radar of a frequency band of 24 GHz, 60 GHz, or 76 GHz, for example. Such an embodiment is described below as an example. The FMCW radar scheme used in the present disclosure may include an FCM scheme (Fast-Chirp Modulation) for transmitting chirp signals at a shorter period than usual. A signal generated by a signal generating unit 21 is not limited to a signal of the FM-CW scheme. The signal generated by the signal generating unit 21 may be a signal of various schemes other than the FM-CW scheme. A transmission signal sequence stored in a storage unit 40 may change in accordance with these various schemes. For example, in the case of a radar signal of the FM-CW scheme described above, a signal whose frequency increases for each time sample and a signal whose frequency decreases for each time sample may be used. More detailed description of the various schemes described above is omitted because known techniques can be appropriately employed.

As illustrated in FIG. 2, the electronic device 1 according to the one embodiment is constituted by the sensor 5 and an ECU (Electronic Control Unit) 50. The ECU 50 controls various operations of the mobility device 100. The ECU 50 may be constituted by at least one or more ECUs. The electronic device 1 according to the one embodiment includes the control unit 10. The electronic device 1 according to the one embodiment may also appropriately include another functional unit such as at least any of a transmission unit 20, reception units 30A to 30D, and the storage unit 40. As illustrated in FIG. 2, the electronic device 1 may include a plurality of reception units such as the reception units 30A to 30D. When the reception units 30A, 30B, 30C, and 30D are not distinguished from one another, the reception units 30A, 30B, 30C, and 30D are simply referred to as "reception units 30" below.

The control unit 10 may include a distance FFT processing unit 11, a velocity FFT processing unit 12, a distance-velocity detection determining unit 13, an angle-of-arrival estimating unit 14, and an object detecting unit 15. These functional units included in the control unit 10 are further described later.

As illustrated in FIG. 2, the transmission unit 20 may include the signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the plurality of reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the control unit 10.

The control unit 10 included in the electronic device 1 according to the one embodiment is capable of controlling the individual functional units of the electronic device 1 and also controlling operations of the entire electronic device 1. To provide control and processing capabilities for executing various functions, the control unit 10 may include at least one processor, for example, a CPU (Central Processing Unit). The control unit 10 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the control unit 10 may be configured as, for example, a CPU and a program executed by the CPU. The control unit 10 may appropriately include a memory required for operations of the control unit 10.

The storage unit 40 may store a program executed by the control unit 10, results of processing performed by the control unit 10, etc. The storage unit 40 may function as a work memory of the control unit 10. The storage unit 40 may be constituted, for example, by a semiconductor memory or a magnetic disk. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the control unit 10 as described above.

In the one embodiment, the storage unit 40 may store various parameters for setting a range in which detection of an object is performed on the basis of a transmission wave T transmitted from each transmission antenna 25 and a reflected wave R received from each reception antenna 31.

In the electronic device 1 according to the one embodiment, the control unit 10 is capable of controlling at least one of the transmission unit 20 and the reception units 30. In this case, the control unit 10 may control at least one of the transmission unit 20 and the reception units 30 on the basis of various kinds of information stored in the storage unit 40. In the electronic device 1 according to the one embodiment, the control unit 10 may instruct the signal generating unit 21 to generate a signal or may control the signal generating unit 21 to generate a signal.

In accordance with control performed by the control unit 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the control unit 10, for example. Specifically, the signal generating unit 21 may allocate a frequency of the transmission signal in accordance with a parameter set by the control unit 10, for example. For example, the signal generating unit 21 receives frequency information from the control unit 10 or the storage unit 40 and generates a signal having a predetermined frequency in a frequency band such as from 77 GHz to 81 GHz, for example. The signal generating unit 21 may include a functional unit serving as a voltage control oscillator (VCO), for example.

The signal generating unit 21 may be configured as hardware having the function, as a microcomputer for example, or as a processor such as a CPU and a program or the like executed by the processor for example. Each functional unit described below may also be configured as hardware having the function, as a microcomputer for example if possible, or as a processor such as a CPU and a program or the like executed by the processor for example.

In the electronic device 1 according to the one embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. The signal to be generated by the signal generating unit 21 may be set in advance by the control unit 10, for example. The signal generated by the signal generating unit 21 may be stored in advance in the storage unit 40 or the like, for example. Since chirp signals used in a technical field such as radar are known, more detailed description is appropriately simplified or omitted. The signal generated by the signal generating unit 21 is supplied to the synthesizer 22.

Figure 3:
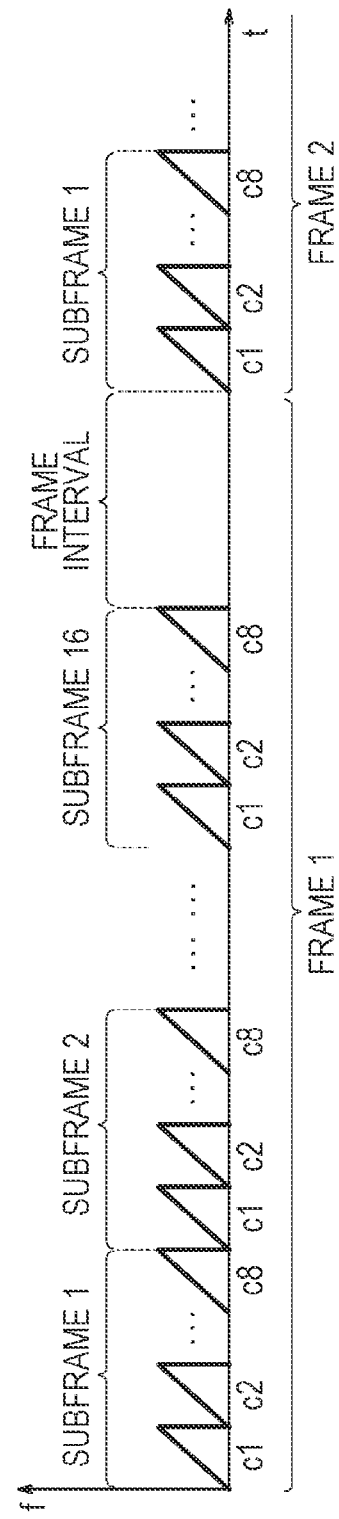
FIG. 3 is a diagram for describing a configuration of a transmission signal according to the one embodiment.

FIG. 3 is a diagram for describing an example of chirp signals generated by the signal generating unit 21.

In FIG. 3, the horizontal axis represents an elapse of time, and the vertical axis represents a frequency. In the example illustrated in FIG. 3, the signal generating unit 21 generates linear chirp signals whose frequency changes linearly and periodically. In FIG. 3, the individual chirp signals are denoted by $c_1, c_2, \ldots, c_8$. As illustrated in FIG. 3, the frequency of each chirp signal linearly increases as time elapses.

In the example illustrated in FIG. 3, eight chirp signals $c_1, c_2, \ldots, c_8$ constitute one subframe. That is, each of subframes such as a subframe 1 and a subframe 2 illustrated in FIG. 3 includes eight chirp signals $c_1, c_2, \ldots, c_8$. In the example illustrated in FIG. 3, 16 subframes such as the subframes 1 to 16 constitute one frame. That is, each of frames such as a frame 1 and a frame 2 illustrated in FIG. 3 includes 16 subframes. As illustrated in FIG. 3, a frame interval of a predetermined length may be included between frames. One frame illustrated in FIG. 3 may have a length of about 30 ms to 50 ms, for example.

In FIG. 3, the frame 2 and subsequent frames may have the same and/or similar configuration. In FIG. 3, the frame 3 and subsequent frames may have the same and/or similar configuration. In the electronic device 1 according to the one embodiment, the signal generating unit 21 may generate a transmission signal as any number of frames. In FIG. 3, an illustration of some chirp signals is omitted. As described above, a relationship between time and a frequency of the transmission signal generated by the signal generating unit 21 may be stored in the storage unit 40 or the like, for example.

As described above, the electronic device 1 according to the one embodiment may transmit a transmission signal constituted by subframes each including a plurality of chirp signals. The electronic device 1 according to the one embodiment may transmit a transmission signal constituted by frames each including a predetermined number of subframes.

Description is given below on the assumption that the electronic device 1 transmits a transmission signal having a frame structure illustrated in FIG. 3. However, the frame structure illustrated in FIG. 3 is an example. For example, the number of chirp signals included in one subframe is not limited to eight. In the one embodiment, the signal generating unit 21 may generate a subframe including any number (for example, a plurality) of chirp signals. A subframe structure illustrated in FIG. 3 is an example. For example, the number of subframes included in one frame is not limited to 16. In the one embodiment, the signal generating unit 21 may generate a frame including any number (for example, a plurality) of subframes. The signal generating unit 21 may generate signals having different frequencies. The signal generating unit 21 may generate a plurality of discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from the transmission antenna 25. The frequency selected as the frequency of the transmission wave T to be transmitted from the transmission antenna 25 may be set by the control unit 10, for example. The frequency selected as the frequency of the transmission wave T to be transmitted from the transmission antenna 25 may be stored in the storage unit 40, for example. The signal whose frequency has been increased by the synthesizer 22 is supplied to the phase control unit 23 and the mixer 33. When the plurality of phase control units 23 are present, the signal whose frequency has been increased by the synthesizer 22 may be supplied to each of the plurality of phase control units 23. When the plurality of reception units 30 are present, the signal whose frequency has been increased by the synthesizer 22 may be supplied to each of the mixers 33 of the plurality of reception units 30.

Each of the phase control units 23 controls a phase of the transmission signal supplied from the synthesizer 22. Specifically, for example, in accordance with control performed by the control unit 10, each of the phase control units 23 may appropriately advance or delay the phase of the signal supplied from the synthesizer 22 to adjust the phase of the transmission signal. In this case, on the basis of a difference between paths of the transmission waves T to be transmitted from the plurality of transmission antennas 25, the phase control units 23 may adjust the phases of the respective transmission signals. The phase control units 23 appropriately adjust the phases of the respective transmission signals, so that the transmission waves T transmitted from the plurality of transmission antennas 25 enhance with each other in a predetermined direction to form a beam (beamforming). In this case, a correlation between a direction of beamforming and amounts of phase by which the respective transmission signals transmitted by the plurality of transmission antennas 25 are controlled may be stored in the storage unit 40, for example. The transmission signal whose phase is controlled by each of the phase control units 23 is supplied to a respective one of the amplifiers 24.

The amplifier 24 amplifies power (electric power) of the transmission signal supplied from the phase control unit 23 in accordance with control performed by the control unit 10, for example. When the sensor 5 includes the plurality of transmission antennas 25, each of the plurality of amplifiers 24 may amplify power (electric power) of the transmission signal supplied from a respective one of the plurality of phase control units 23 in accordance with control performed by the control unit 10, for example. Since the technology for amplifying power of a transmission signal is already known, more detailed description is omitted. Each of the amplifiers 24 is connected to a respective one of the transmission antennas 25.

The transmission antenna 25 outputs (transmits), as the transmission wave T, the transmission signal amplified by the amplifier 24. When the sensor 5 includes the plurality of transmission antennas 25, each of the plurality of transmission antennas 25 may output (transmit), as the transmission wave T, the transmission signal amplified by a respective one of the plurality of amplifiers 24. Since the transmission antennas 25 can be configured in a manner that is the same as and/or similar to that of transmission antennas for use in the known radar technology, more detailed description is omitted.

The electronic device 1 according to the one embodiment, which includes the transmission antennas 25, is capable of transmitting transmission signals (for example, transmission chirp signals) as the transmission waves T from the respective transmission antennas 25 in this manner. At least one of the functional units constituting the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The transmission antennas 25 are covered with a member such as the radar cover, so that a risk of the transmission antennas 25 being damaged or malfunctioning because of a contact with an external object can be reduced. The radar cover and the housing may also be referred to as a radome.

FIG. 2 illustrates an example in which the electronic device 1 includes two transmission antennas 25. However, in the one embodiment, the electronic device 1 may include any number of transmission antennas 25. On the other hand, in the one embodiment, the electronic device 1 may include the plurality of transmission antennas 25 in the case where the transmission waves T transmitted from the respective transmission antennas 25 form a beam in a predetermined direction. In the one embodiment, the electronic device 1 may include a plurality of transmission antennas 25. In this case, the electronic device 1 may include the plurality of phase control units 23 and the plurality of amplifiers 24 to correspond to the plurality of transmission antennas 25. Each of the plurality of phase control units 23 may control the phase of a respective one of the plurality of transmission waves supplied from the synthesizer 22 and to be transmitted from the plurality of transmission antennas 25. Each of the plurality of amplifiers 24 may amplify power of a respective one of the plurality of transmission signals to be transmitted from the plurality of transmission antennas 25. In this case, the sensor 5 may include the plurality of transmission antennas. As described above, when the electronic device 1 illustrated FIG. 2 includes the plurality of transmission antennas 25, the electronic device 1 may include a plurality of functional units necessary for transmitting the transmission waves T from the plurality of transmission antennas 25.

The reception antenna 31 receives the reflected wave R. The reflected wave R may be the transmission wave T reflected off the predetermined object 200. The reception antenna 31 may include a plurality of antennas such as the reception antennas 31A to 31D, for example. Since the reception antennas 31 can be configured in a manner that is the same as and/or similar to that of reception antennas for use in the known radar technology, more detailed description is omitted. The reception antenna 31 is connected to the LNA 32. A reception signal based on the reflected wave R received by each of the reception antennas 31 is supplied to the LNA 32.

The electronic device 1 according to the one embodiment can receive, from each of the plurality of reception antennas 31, the reflected wave R that is the transmission wave T that has been transmitted as the transmission signal (transmission chirp signal) such as a chirp signal, for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows electromagnetic waves to pass therethrough. This radar cover may also serve as a housing of the sensor 5, for example. The reception antennas 31 are covered with a member such as the radar cover, so that a risk of the reception antennas 31 being damaged or malfunctioning because of a contact with an external object can be reduced. The radar cover and the housing may also be referred to as a radome.

When the reception antennas 31 are installed near the transmission antennas 25, these may be collectively included in one sensor 5. That is, for example, one sensor 5 may include at least one transmission antenna 25 and at least one reception antenna 31. For example, one sensor 5 may include the plurality of transmission antennas 25 and the plurality of reception antennas 31. In such a case, one radar sensor may be covered with a cover member such as one radar cover, for example.

The LNA 32 amplifies, with low noise, the reception signal based on the reflected wave R received by the corresponding reception antenna 31. The LNA 32 may be a low-noise amplifier and amplifies, with low noise, the reception signal supplied from the corresponding reception antenna 31. The reception signal amplified by the LNA 32 is supplied to the mixer 33.

The mixer 33 mixes (multiplies) the reception signal having a radio frequency (RF) supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to decrease the frequency of the beat signal to an intermediate frequency (IF). The beat signal whose frequency has been decreased by the IF unit 34 is supplied to the AD conversion unit 35.

The AD conversion unit 35 digitizes the analog beat signal supplied from the IF unit 34. The AD conversion unit 35 may be constituted by any analog-to-digital conversion circuit (Analog to Digital Converter (ADC)). The digitized beat signal obtained by the AD conversion unit 35 is supplied to the distance FFT processing unit 11 of the control unit 10. In the case where there are the plurality of reception units 30, the beat signals each digitized by a respective one of the plurality of AD conversion units 35 may be supplied to the distance FFT processing unit 11.

The distance FFT processing unit 11 estimates a distance between the mobility device 100 equipped with the electronic device 1 and the object 200 on the basis of the beat signals supplied from the respective AD conversion units 35. The distance FFT processing unit 11 may include a processing unit that performs fast Fourier transform, for example. In this case, the distance FFT processing unit 11 may be configured as any circuit, any chip, or the like that performs fast Fourier transform (FFT). The distance FFT processing unit 11 may preform Fourier transform other than fast Fourier transform.

The distance FFT processing unit 11 performs FFT processing (hereinafter, appropriately referred to as "distance FFT processing") on the beat signal that has been digitized by each of the AD conversion units 35. For example, the distance FFT processing unit 11 may perform the FFT processing on a complex signal supplied from each of the AD conversion units 35. The beat signal that has been digitized by each of the AD conversion units 35 can be represented as a temporal change in signal intensity (power). The distance FFT processing unit 11 performs FFT processing on such a beat signal, so that the beat signal can be represented as a signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, there is known a method for determining that an object (reflecting object) that reflects a transmission wave is present, when a peak value that is equal to or greater than a threshold is detected from the average power or amplitude of a disturbance signal, such as constant false alarm rate (CFAR)-based detection processing.

As described above, the electronic device 1 according to the one embodiment can detect, as the target, the object 200 that reflects the transmission wave T, based on the transmission signal transmitted as the transmission wave T and the reception signal received as the reflected wave R. In the one embodiment, the operation described above may be performed by the control unit 10 of the electronic device 1.

The distance FFT processing unit 11 can estimate a distance to the predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. The result (for example, distance information) of the distance FFT processing performed by the distance FFT processing unit 11 may be supplied to the velocity FFT processing unit 12. The result of the distance FFT processing performed by the distance FFT processing unit 11 may also be supplied to the distance-velocity detection determining unit 13, the object detecting unit 15, and/or the like.

The velocity FFT processing unit 12 estimates a relative velocity between the mobility device 100 equipped with the electronic device 1 and the object 200 on the basis of the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured as any circuit, any chip, or the like that performs fast Fourier transform (FFT). The velocity FFT processing unit 12 may preform Fourier transform other than fast Fourier transform.

The velocity FFT processing unit 12 further performs FFT processing (hereinafter, appropriately referred to as "velocity FFT processing") on each beat signal on which the distance FFT processing has been performed by the distance FFT processing unit 11. For example, the velocity FFT processing unit 12 may perform the FFT processing on each complex signal supplied from the distance FFT processing unit 11. The velocity FFT processing unit 12 can estimate a relative velocity to the predetermined object on the basis of a subframe (for example, the subframe 1 illustrated in FIG. 3) including chirp signals. When the distance FFT processing is performed on the beat signal in the above-described manner, a plurality of vectors can be generated. The velocity FFT processing unit 12 can estimate a relative velocity to the predetermined object by determining a phase of a peak in a result obtained by performing the velocity FFT processing on the plurality of vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. The result (for example, velocity information) of the velocity FFT processing performed by the velocity FFT processing unit 12 may be supplied to the angle-of-arrival estimating unit 14. The result of the velocity FFT processing performed by the velocity FFT processing unit 12 may also be supplied to the distance-velocity detection determining unit 13, the object detecting unit 15, and/or the like.

The distance-velocity detection determining unit 13 performs determination processing for a distance and/or a relative velocity on the basis of the result of the distance FFT processing performed by the distance FFT processing unit 11 and/or the result of the velocity FFT processing performed by the velocity FFT processing unit 12. The distance-velocity detection determining unit 13 determines whether the target is detected at a predetermined distance and/or a predetermined relative velocity. The distance-velocity detection determining unit 13 is further described below.

The angle-of-arrival estimating unit 14 estimates a direction from which the reflected wave R arrives from the predetermined object 200 on the basis of the result of the velocity FFT processing performed by the velocity FFT processing unit 12. The electronic device 1 can estimate the direction from which the reflected wave R arrives, by receiving the reflected wave R from the plurality of reception antennas 31. For example, the plurality of reception antennas 31 are arranged at a predetermined interval. In this case, the transmission wave T transmitted from each of the transmission antennas 25 is reflected off the predetermined object 200 to become the reflected wave R. Each of the plurality of reception antennas 31 arranged at the predetermined interval receives the reflected wave R. The angle-of-arrival estimating unit 14 can estimate the direction from which the reflected wave R arrives at each of the plurality of reception antennas 31 on the basis of the phase of the reflected wave R received by the reception antenna 31 and a difference in path of the reflected wave R. That is, the electronic device 1 can measure (estimate) the angle of arrival $\theta$ illustrated in FIG. 1 on the basis of the result of the velocity FFT processing.

Various techniques for estimating the direction from which the reflected wave R arrives on the basis of a result of velocity FFT processing have been proposed. For example, MUSIC (MUltiple SIgnal Classification), ESPRIT (Estimation of Signal Parameters via Rotational Invariance Technique), and the like are known as known arriving direction estimation algorithms. Thus, more detailed description of the known techniques is appropriately simplified or omitted. Information (angle information) on the angle of arrival $\theta$ estimated by the angle-of-arrival estimating unit 14 may be supplied to the object detecting unit 15.

The object detecting unit 15 detects an object located in a range in which the transmission wave T is transmitted, on the basis of the information supplied from at least any of the distance FFT processing unit 11, the velocity FFT processing unit 12, and the angle-of-arrival estimating unit 14. The object detecting unit 15 may perform detection of an object by performing, for example, clustering processing on the basis of the supplied distance information, velocity information, and angle information. For example, DBSCAN (Density-based spatial clustering of applications with noise) or the like is known as an algorithm used in clustering of data. In the clustering processing, for example, average power of points constituting the detected object may be calculated. The distance information, the velocity information, the angle information, and the power information of the object detected by the object detecting unit 15 may be supplied to the ECU 50 or the like, for example. In this case, when the mobility device 100 is an automobile, communication may be performed using a communication interface such as a CAN (Controller Area Network), for example.

The ECU 50 included in the electronic device 1 according to the one embodiment is capable of controlling the functional units of the mobility device 100 and also controlling operations of the entire mobility device 100. To provide control and processing capabilities for executing various functions, the ECU 50 may include at least one processor, for example, a CPU (Central Processing Unit). The ECU 50 may be collectively implemented by one processor, may be implemented by some processors, or may be implemented by discrete individual processors. The processor may be implemented as one integrated circuit. The integrated circuit is also referred to as an IC. The processor may be implemented as a plurality of integrated circuits and discrete circuits connected to be able to perform communication. The processor may be implemented on the basis of various other known technologies. In the one embodiment, the ECU 50 may be configured as, for example, a CPU and a program executed by the CPU. The ECU 50 may appropriately include a memory required for operations of the ECU 50. At least part of the functions of the control unit 10 may be functions of the ECU 50, or at least part of the functions of the ECU 50 may be functions of the control unit 10.

The electronic device 1 illustrated in FIG. 2 includes the two transmission antennas 25 and the four reception antennas 31. However, the electronic device 1 according to the one embodiment may include any number of transmission antennas 25 and any number of reception antennas 31. For example, by including the two transmission antennas 25 and the four reception antennas 31, the electronic device 1 can be regarded to include a virtual antenna array that is virtually constituted by eight antennas. As described above, the electronic device 1 may receive the reflected wave R of 16 subframes illustrated in FIG. 3 by using, for example, the eight virtual antennas.

Target detection processing performed by the electronic device 1 according to the one embodiment is described next.

As described above, the electronic device 1 according to the one embodiment transmits transmission waves from the transmission antennas and receives, from the reception antennas, reflected waves that are the transmission waves reflected off an object serving as a target and/or clutter. The electronic device 1 according to the one embodiment may detect, as the target, the object that reflects the transmission wave, on the basis of the transmission signal and/or the reception signal.

In a common FM-CW radar technology, whether a target is present can be determined on the basis of a result of fast Fourier transform processing or the like performed on a beat frequency extracted from a reception signal. The result of the fast Fourier transform processing or the like performed on the beat frequency extracted from the reception signal includes a noise component due to clutter (extraneous reflection component) or the like. Thus, processing for removing the noise component from the processing result of the reception signal and for extracting a target signal alone may be performed.

As a technique for determining whether the target is present, there is a scheme (threshold detection scheme) in which a threshold is set for output of the reception signal and it is determined that the target is present if the intensity of a reflected signal exceeds the threshold. When this scheme is employed, the target is determined also when the signal intensity of clutter exceeds the threshold. Consequently, a so-called "false alarm" is issued. Whether the signal intensity of this clutter exceeds the threshold is a matter of a probability. The probability of the signal intensity of this clutter exceeding the threshold is called "a probability of false alarm". As a technique for suppressing this probability of false alarm to be low and constant, the constant false alarm rate can be used.

Hereinafter, the constant false alarm rate is also simply referred to as CFAR. CFAR employs an assumption that the signal intensity (amplitude) of noise conforms to a Rayleigh distribution. Based on this assumption, if a weight for use in calculation of a threshold for use in determining whether a target is detected is fixed, an error rate in detection of the target becomes theoretically constant regardless of the amplitude of noise.

As CFAR in the common radar technology, a scheme called Cell-Averaging CFAR (hereinafter, also referred to as CA-CFAR) is known. In CA-CFAR, a signal intensity value (for example, an amplitude value) of the reception signal having undergone predetermined processing may be sequentially input to a shift register at a constant sampling frequency. This shift register has a cell under test at the center and has a plurality of reference cells on both sides of the cell under test. Every time the signal intensity value is input to the shift register, each signal intensity value input previously is moved from a cell on one end side (for example, a left end side) to a cell on the other end side (for example, a right end side) of the shift register by one. In synchronization with the input timing, the values in the reference cells are averaged. The average value thus obtained is multiplied by a prescribed weight, and the result is calculated as a threshold. If the value in the cell under test is greater than the threshold thus calculated, the value in the cell under test is output as it is. On the other hand, if the value in the cell under test is not greater than the calculated threshold, a value of 0 is output. As described above, in CA-CFAR, the threshold is calculated from the average value of the values in the reference cells and whether a target is present is determined. In this manner, a detection result can be obtained.

In CA-CFAR, for example, when a plurality of targets are present in the vicinity to each other, the threshold calculated in the vicinity of the targets increases because of the nature of the algorithm. Thus, there may be a target that is not detected regardless of the sufficient signal intensity. Likewise, when there is a clutter step, the calculated threshold increases also in the vicinity of the clutter step. Also in this case, detection of a small target located in the vicinity of the clutter step may fail.

In relation to CA-CFAR described above, there is a technique called Order Statistic CFAR (hereinafter, also referred to as OS-CFAR) as a technique for obtaining a threshold from the median of the values in the reference cells or from a value at a prescribed place in order of the values in the reference cells sorted in ascending order. OS-CFER is a technique in which a threshold is set on the basis of ordered statistics and it is determined that a target is present if the signal intensity exceeds the threshold. This OS-CFAR can cope with the above-described issues in CA-CFAR. OS-CFAR can be implemented by performing processing that is partially different from that of CA-CFAR.

An example in which the electronic device 1 according to the one embodiment performs OS-CFAR processing is further described below.

In the electronic device 1 according to the one embodiment, for example, the distance-velocity detection determining unit 13 of the control unit 10 illustrated in FIG. 2 may perform the OS-CFAR processing. In the electronic device 1 according to the one embodiment, for example, the distance FFT processing unit 11 and/or the velocity FFT processing unit 12 of the control unit 10 illustrated in FIG. 2 may perform the OS-CFAR processing. An example of the case where the distance-velocity detection determining unit 13 performs the OS-CFAR processing is described below with reference to FIG. 4.

As described in FIG. 2, in the electronic device 1 according to the one embodiment, the frequency of the chirp signal generated by the signal generating unit 21 is increased by the synthesizer 22 to the frequency in the selected frequency band. The frequency-increased chirp signal is transmitted from the transmission antennas 25 through the phase control units 23 and the amplifiers 24. The chirp signal reflected off a reflecting object passes through the reception antenna 31 and the LNA 32 and is multiplied by the transmission signal in the mixer 33, and is received by the AD conversion unit 35 through the IF unit 34. The distance FFT processing unit 11 performs the distance FFT processing on the complex signal received by the AD conversion unit 35.

Figure 4:
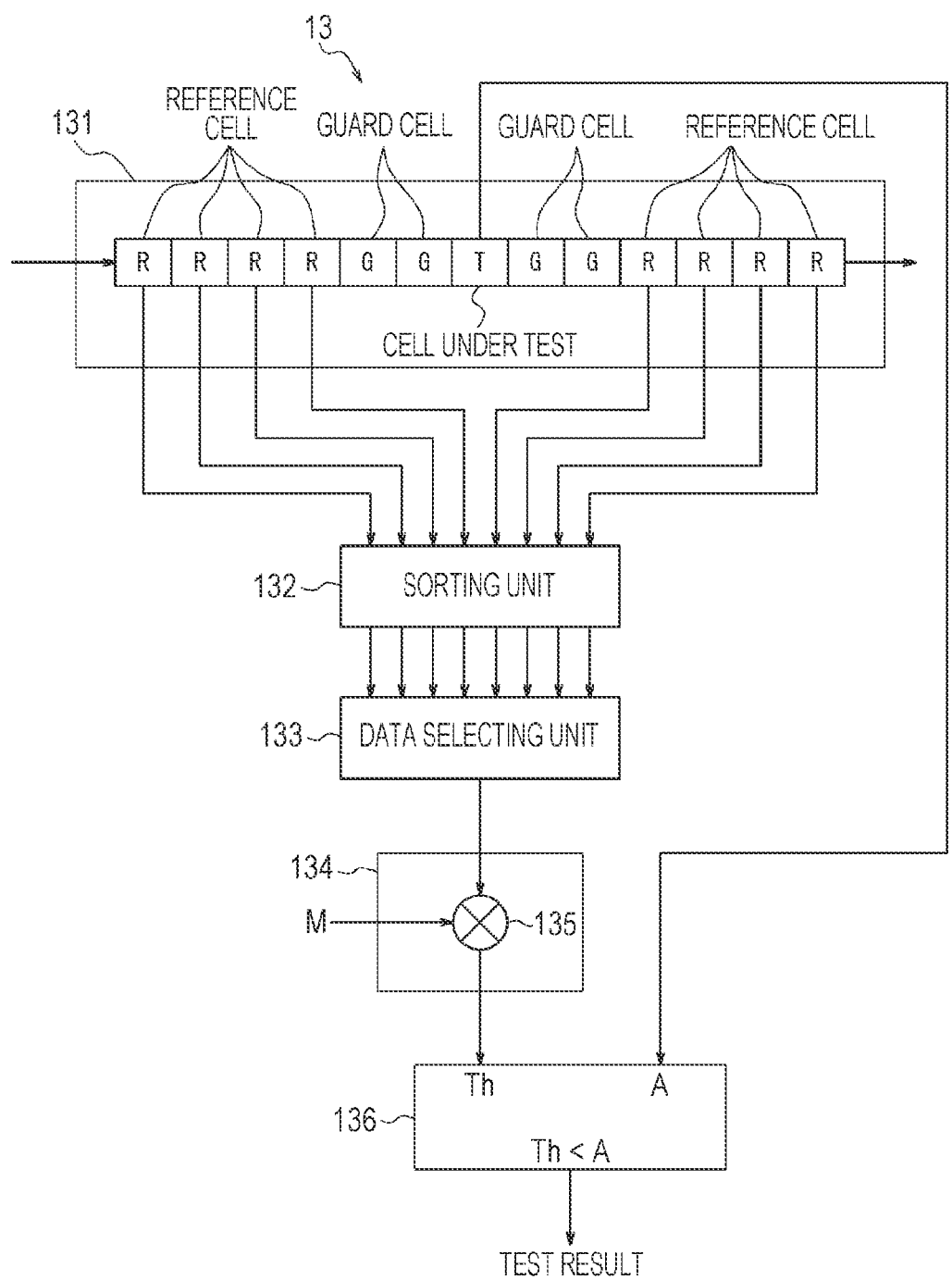
FIG. 4 is a diagram for describing processing blocks in a control unit according to the one embodiment.

In the one embodiment, the distance-velocity detection determining unit 13 may perform the OS-CFAR processing on the signal having undergone the distance FFT processing. FIG. 4 is a block diagram for describing processing performed by the control unit 10 of the electronic device 1 according to the one embodiment. More specifically, FIG. 4 is a diagram for describing an example of a logic of circuitry that performs the OS-CFAR processing in the distance-velocity detection determining unit 13 of the control unit 10. To perform the OS-CFAR processing, the distance-velocity detection determining unit 13 may include a shift register 131, a sorting unit 132, a data selecting unit 133, a threshold calculating unit 134, a weight setting unit 135, and a detection determining unit 136 as illustrated in FIG. 4.

In OS-CFAR, as in the case of CA-CFAR, a signal intensity value of the reception signal having undergone predetermined processing may be sequentially input to the shift register 131 at a constant sampling frequency. Every time the signal intensity value is input to the shift register 131, each signal intensity value input previously is moved from a cell on one end side (for example, a left end side) to a cell on the other end side (for example, a right end side) of the shift register 131 by one. As described above, in the one embodiment, in the shift register 131 (of the distance-velocity detection determining unit 13), the signal intensity based on the reception signal input from one end at the predetermined sampling frequency may be shifted toward the other end in a first-in first-out manner.

As illustrated in FIG. 4, the shift register 131 may have a cell under test T in a test region at the center. Hereinafter, a region in which the cell under test T is arranged may also be referred to as a "test region". The shift register 131 may also have guard cells G in guard regions on both sides of the cell under test T. FIG. 4 illustrates the guard cells G as two contiguous cells. However, the number of guard cells G may be any number. Hereinafter, a region in which the guard cell G is arranged may also be referred to as a "guard region". The shift register 131 further has a plurality of reference cells R in reference regions on the respective outer sides of the guard cells G. FIG. 4 illustrates the reference cells R as four contiguous cells. However, the number of reference cells R may be any number. Hereinafter, a region in which the reference cell R is arranged may also be referred to as a "reference region". As described above, in the one embodiment, the control unit 10 (the shift register 131 of the distance-velocity detection determining unit 13) may establish the guard region between the test region and the reference region in the distance direction. As described above, in the one embodiment, the shift register 131 may include the cell under test T in the test region and the reference cells R in the reference regions.

The sorting unit 132 sorts values output from the respective reference cells R in ascending order. The sorting unit 132 may be constituted by, for example, any sorting circuit or the like. The sorting unit 132 may sort the values in the reference cells R in ascending order, in synchronization with a timing at which the signal intensity is input to the shift register 131. As described above, in the one embodiment, the control unit 10 (the distance-velocity detection determining unit 13) may include the sorting unit 132 that sorts, in ascending order, signal intensities output from the reference cells R of the shift register 131.

The data selecting unit 133 may select and extract a value at a prescribed position (for example, at a predetermined place in order from the smallest) from among the values sorted by the sorting unit 132. As described above, in the one embodiment, the control unit 10 (the distance-velocity detection determining unit 13) may include the data selecting unit 133 that selects a signal intensity at a predetermined place in order from among the signal intensities sorted by the sorting unit 132.

The threshold calculating unit 134 may calculate a threshold Th by multiplying the value selected by the data selecting unit 133 by a prescribed weight. In this case, the weight setting unit 135 may calculate the threshold Th by multiplying the value selected by the data selecting unit 133 by, for example, a prescribed weight M. As described above, in the one embodiment, the control unit 10 (the distance-velocity detection determining unit 13) may include the threshold calculating unit 134 that sets a threshold for use in detection of the target on the basis of the signal intensity selected by the data selecting unit 133.

The detection determining unit 136 compares a magnitude of a signal intensity value A in the cell under test T with the threshold Th calculated by the threshold calculating unit 134. If the signal intensity value A in the cell under test T is greater than the threshold Th, the detection determining unit 136 outputs, as a detection result, the signal intensity value A in the cell under test T as it is. On the other hand, if the signal intensity value A in the cell under test T is not greater than the threshold Th, the detection determining unit 136 outputs zero as the detection result. As described above, in the one embodiment, the control unit 10 (the detection determining unit 136 of the distance-velocity detection determining unit 13) may determine whether a target is present on the basis of the signal intensity value A in the cell under test T in the test region and the threshold Th.

In OS-CFAR, the threshold is calculated from the value at a prescribed position (for example, at a predetermined place in order from the smallest) among the sorted signal intensities. Thus, an influence of a signal based on a reflected wave on calculation of the threshold may be suppressed. Therefore, with OS-CFAR, an increase in the threshold may be suppressed in the vicinity of the targets. In addition, with OS-CFAR, an increase in the threshold may be suppressed in the vicinity of the clutter step.

Figure 5:
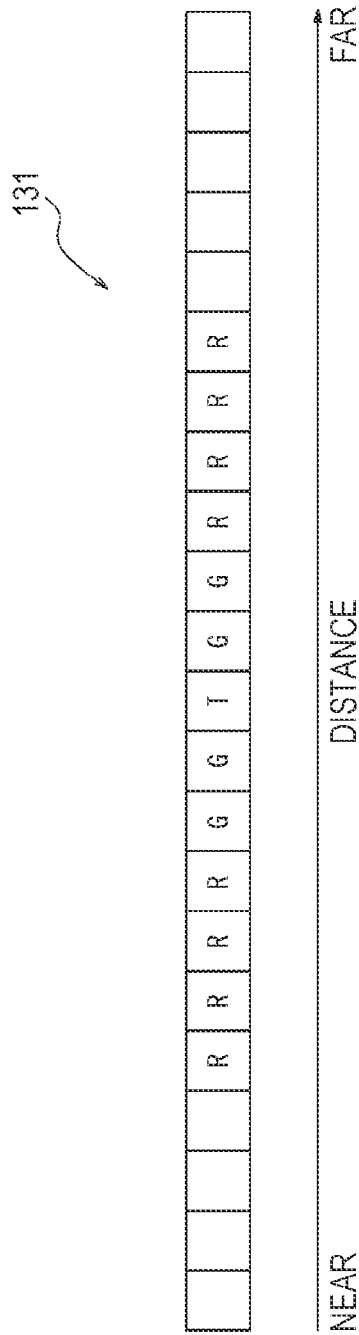
FIG. 5 is a diagram for describing an example in which the electronic device according to the one embodiment performs OS-CFER processing.

In the electronic device 1 according to the one embodiment, the distance FFT processing unit 11 performs the distance FFT processing on the beat signal digitized by the AD conversion unit 35, so that a distribution of the signal intensity (power) in the distance direction is obtained. As described above, the signal on which the distance FFT processing has been performed by the distance FFT processing unit 11 may be supplied to (the shift register 131 of) the distance-velocity detection determining unit 13. In this case, as illustrated in FIG. 5, the right side in the shift register 131 may correspond to a distance far from the sensor 5 of the electronic device 1. In addition, the left side in the shift register 131 may correspond to a distance near the sensor 5 of the electronic device 1. FIG. 5 is a diagram for describing an example in which the electronic device 1 according to the one embodiment performs the OS-CFER processing. In FIG. 5, the cell under test T, the guard cells G, and the reference cells R are arranged in the same manner as in the example illustrated in FIG. 4.

By using OS-CFAR described above, the electronic device 1 according to the one embodiment can determine detection of a distance. That is, the control unit 10 of the electronic device 1 according to the one embodiment calculates a distance threshold Th on the basis of a value at a predetermined place in order (for example, K-th) from the smallest among signal intensities (powers) in the reference cells R. The control unit 10 of the electronic device 1 according to the one embodiment can determine that the target is present in the test region if the signal intensity value A in the cell under test T is greater than the distance threshold Th.

Figure 6:
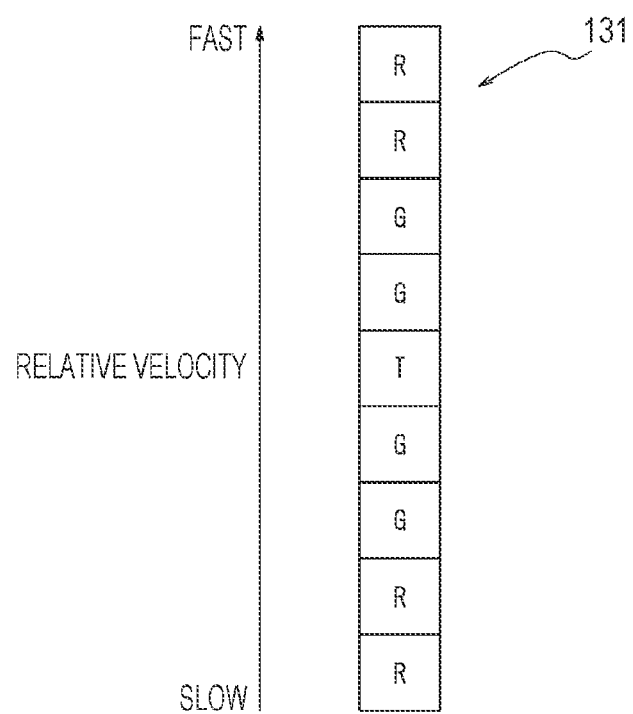
FIG. 6 is a diagram for describing the example in which the electronic device according to the one embodiment performs the OS-CFER processing.

At the distance at which the target is determined to be present in this manner, the velocity FFT processing unit 12 of the control unit 10 may perform the velocity FFT processing on the plurality of chirp signals. As in the case of the distance FFT processing described above, the distance-velocity detection determining unit 13 may determine detection of a velocity. As described above, the signal on which the velocity FFT processing has been performed by the velocity FFT processing unit 12 may be supplied to (the shift register 131 of) the distance-velocity detection determining unit 13. In this case, as illustrated in FIG. 6, the upper side in the shift register 131 may correspond to a region where the relative velocity between the sensor 5 of the electronic device 1 and the target is fast. In addition, as illustrated in FIG. 6, the lower side in the shift register 131 may correspond to a region where the relative velocity between the sensor 5 of the electronic device 1 and the target is slow. FIG. 6 is a diagram for describing the example in which the electronic device 1 according to the one embodiment performs the OS-CFER processing. The cell under test T, the guard cells G, and the reference cells R are arranged also in FIG. 6. The arrangement illustrated in FIG. 6 is an example. As described above, the electronic device 1 according to the one embodiment can determine detection of a velocity by using the constant false alarm rate in the velocity direction.

By using the constant false alarm rate in the velocity direction, the electronic device 1 according to the one embodiment can determine detection of a distance and detection of a velocity in the above-described manner. As described above, in the electronic device 1 according to the one embodiment, the control unit 10 may detect a target by using the constant false alarm rate on the basis of a transmission signal transmitted as a transmission wave and a reception signal received as a reflected wave. In this case, the control unit 10 may establish reference regions (reference cells R) in the distance direction and the relative velocity direction with respect to the test region (cell under test) in the two-dimensional distribution of signal intensities based on the reception signal in the distance direction and the relative velocity direction. The control unit 10 may then set the threshold for use in detection of the target on the basis of an order statistic among the signal intensities in the reference regions (reference cells R) thus established.

An example of an operation of the electronic device 1 according to the one embodiment is further described next.

When the electronic device 1 according to the one embodiment is mounted in a mobility device such as an automobile, for example, if only a moving object is detected as a target by skipping detection of a stationary object, the processing load of the electronic device 1 can be reduced. To detect only a moving object as the target, detection result of a stationary object is just removed from detection results obtained by the electronic device 1. For example, if the detection result of a stationary object is removed, the distance-velocity detection determining unit 13 need not perform processing of detecting the target by using the constant false alarm rate at the distance and the relative velocity of the object. In addition, for example, if the detection result of a stationary object is removed, the angle-of-arrival estimating unit 14 need not perform processing of estimating the angle of arrival of the reflected wave from the object. Further, for example, if the detection result of a stationary object is removed, the object detecting unit 15 need not perform processing of detecting the object. Herein, when the mobility device equipped with the electronic device 1 is moving (such as traveling), the stationary object may be, for example, an object that is stationary on the ground, on the water, or in the space where the mobility device is moving.

For example, a circumstance is assumed in which while a vehicle of interest equipped with an on-vehicle radar is traveling on an expressway, detection of another vehicle or the like located around the vehicle of interest is performed by using the on-vehicle radar. It is assumed that, for example, an object such as a wall is installed over a long distance without interruption along a lane in which the vehicle of interest is traveling. The object such as a wall is stationary on the ground (such as a road) where the vehicle of interest is traveling. In such an environment, an interval between the object such as a wall installed along the lane and the vehicle of interest (a distance in the width direction of the vehicle of interest) is kept substantially constant during traveling. The necessity of detecting a wall whose positional relationship with the vehicle of interest barely changes is expected to be low. On the other hand, the necessity of detecting an object such as another vehicle or a person located around the vehicle of interest is expected to be usually high. In such a case, if the electronic device 1 can skip processing of detecting a stationary object such as a wall as the target, the processing load of the electronic device 1 can be reduced accordingly.

Figure 7:
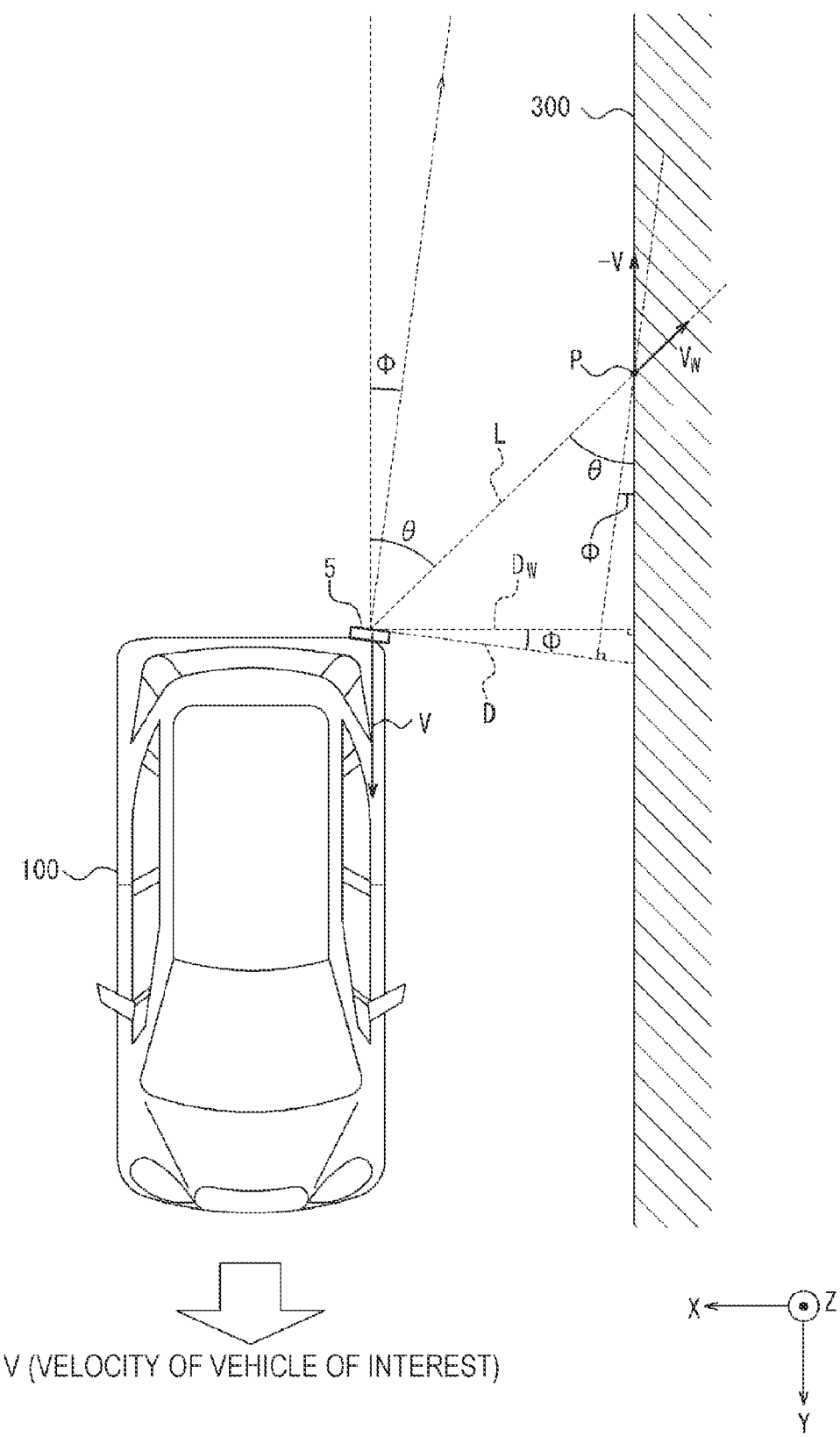
FIG. 7 is a diagram for describing a principle of an operation of the electronic device according to the one embodiment.

FIG. 7 is a diagram schematically illustrating the mobility device 100 equipped with the electronic device 1 according to the one embodiment and surroundings of the mobility device 100. It is assumed that, as illustrated in FIG. 7, in a circumstance described below, the mobility device 100 equipped with the sensor 5 of the electronic device 1 moves (travels) at a certain distance from a wall 300. That is, the wall 300 illustrated in FIG. 7 is disposed to run parallel to the moving direction of the mobility device 100. It is assumed that, as illustrated in FIG. 7, the mobility device 100 equipped with the electronic device 1 is traveling in a positive Y-axis direction illustrated in FIG. 7 at a velocity V. That is, the mobility device 100 illustrated in FIG. 7 has a velocity vector V.

In the example illustrated in FIG. 7, only one sensor 5 of the electronic device 1 is installed at a left rear portion of the mobility device 100 with respect to the traveling direction. However, in the one embodiment, any number of sensors 5 may be installed at any places of the mobility device 100. In the example illustrated in FIG. 7, it may be assumed that the transmission wave T is transmitted from the sensor 5 and the reflected wave R is received by the sensor 5.

In addition, as illustrated in FIG. 7, the sensor 5 is tilted by an azimuth $\Phi$ with respect to a line parallel to an opposite direction (a −V direction, i.e., a negative Y-axis direction) from the traveling direction of the mobility device 100. When the sensor 5 is, for example, a patch antenna, the azimuth $\Phi$ may indicate a direction of the normal to a radiation surface of the sensor 5. That is, the sensor 5 may have a detection range having a certain central angle with the direction of the azimuth $\Phi$ at the center. That is, the normal to the radiation surface of the sensor 5 may be included in an XY plane. In the present disclosure, the normal to the radiation surface of the sensor 5 need not be included in the XY plane. The detection range of the sensor 5 may have a central angle of about 90 degrees clockwise and counterclockwise (that is, about 180 degrees in total) with respect to the direction of the azimuth $\Phi$ at the center. The azimuth $\Phi$ may be any angle and, for example, 0 degrees.

Skipping detection of a stationary object such as the wall 300 and detecting, as the target, a moving object other than the stationary object in the circumstance illustrated in FIG. 7 is discussed. To skip detection of a stationary object such as the wall 300, the control unit 10 of the electronic device 1 determines whether the object is stationary and, if the object is determined to be stationary, performs processing of detecting a target by excluding such an object. In this case, the control unit 10 calculates a relative velocity of the object to the mobility device 100. If the relative velocity is equal to the moving velocity of the mobility device 100, the control unit 10 can determine that the object having such a relative velocity is stationary.

It is assumed that the control unit 10 of the electronic device 1 attempts to detect a point P illustrated in FIG. 7 in the wall 300 as illustrated in FIG. 7, for example. In this case, the transmission wave transmitted from the sensor 5 has an azimuth that is an angle θ from the −V direction, that is, the negative Y-axis direction as illustrated in FIG. 7. For example, when the distance between the mobility device 100 and the wall 300 is short and the azimuth θ of the transmission wave transmitted from the sensor 5 increases, a component of the velocity vector Vw at the point P of the wall 300, perpendicular to the wall 300, decreases. It is expected that in such a case, a component of the velocity vector Vw at the point P of the wall 300, parallel to the wall 300, is detected but the component of the velocity vector Vw at the point P, perpendicular to the wall 300, is not calculated appropriately.

Accordingly, the control unit 10 of the electronic device 1 according to the one embodiment may perform processing to remove a detection point (point P) of the wall 300 determined to be stationary by calculating the velocity vector Vw at the point P of the wall 300. The processing load of, for example, the control unit 10 or the like of the electronic device 1 can be reduced through such processing as described above. In addition, an effect of reducing a risk of falsely detecting the wall 300 through such processing can also be expected.

A method for calculating the velocity vector Vw of the relative velocity of the wall 300 to the mobility device 100 to allow the control unit 10 of the electronic device 1 to perform the processing described above is described. It is assumed in the description below that the magnitude and the direction of the velocity V at which the mobility device 100 moves can be acquired from the ECU 50, for example, and/or a positioning system such as a GPS, for example.

As described above, the control unit 10 of the electronic device 1 may transmit a transmission wave including a plurality of chirp signals from the sensor 5. The distance FFT processing unit 11 of the control unit 10 may perform distance FFT processing on a reception signal based on a reflected wave received by the sensor 5. The velocity FFT processing unit 12 of the control unit 10 may perform velocity FFT processing on a result of the distance Fourier transform.

Figure 8:
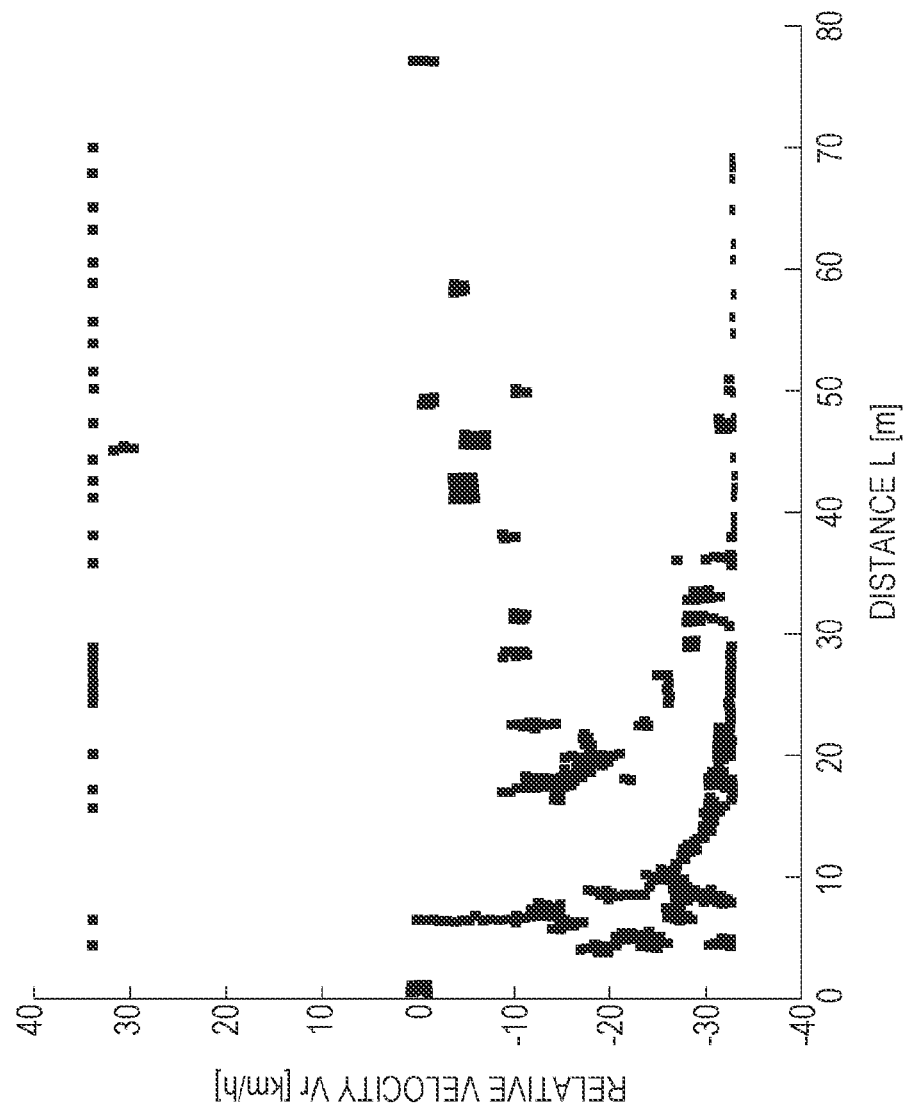
FIG. 8 is a diagram illustrating an example of a processing result obtained by the control unit according to the one embodiment.

FIG. 8 is a diagram illustrating an example of a result of two-dimensional FFT processing performed by the control unit 10. A horizontal axis illustrated in FIG. 8 represents the distance L [m] illustrated in FIG. 7. A vertical axis illustrated in FIG. 8 represents the magnitude [km/h] of the relative velocity Vw of the point P of the wall 300 illustrated in FIG. 7 to the mobility device 100. In FIG. 8, positions of relatively strong peaks in signal intensity (power) in a result of the distance FFT processing and the velocity FFT processing (two-dimensional FFT processing) respectively performed by the distance FFT processing unit 11 and the velocity FFT processing unit 12 are plotted.

Figure 9:
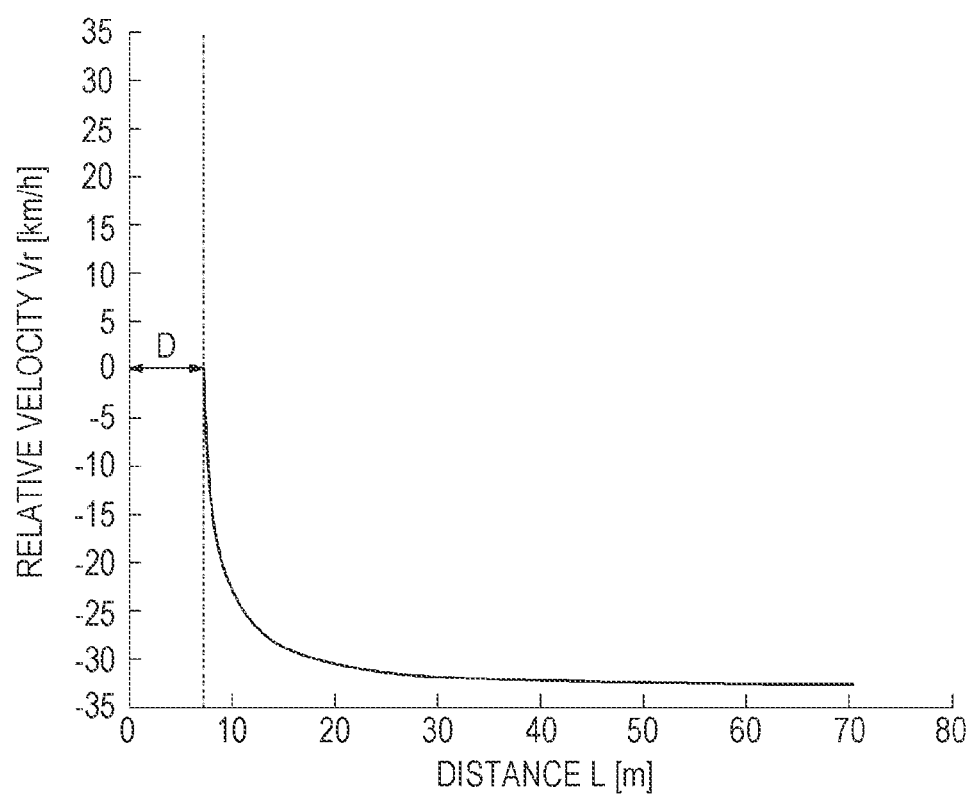
FIG. 9 is a diagram illustrating an example of a processing result obtained by the control unit according to the one embodiment.

FIG. 9 is a diagram illustrating only a result related to the wall 300 in the result of the two-dimensional FFT processing illustrated in FIG. 8, without the other noise. In FIGS. 8 and 9, the magnitude of the velocity V of the mobility device 100 is set to, for example, 33 km/h.

The control unit 10 then calculates a distance D at which the magnitude of the relative velocity Vw becomes equal to 0 km/h from the result of the two-dimensional FFT processing as illustrated in FIG. 8 or 9. From FIG. 9, the distance D at which the magnitude of the relative velocity Vw becomes equal to 0 km/h is calculated to be 7.2 m.

The control unit 10 then calculates a distance Dw between the mobility device 100 and the wall 300 on the basis of the azimuth Φ illustrated in FIG. 7 and the distance D described above. From FIG. 7, the distance Dw can be denoted by Equation (1) below.

$$Dw = D \cos \Phi \qquad (1)$$

The control unit 10 then calculates the angle θ from the radar to the wall by using the detected distance as L. From FIG. 7, the angle θ can be denoted by Equation (2) below.

$$\theta = \arcsin(D \cos \Phi / L) \qquad (2)$$

On the other hand, from FIG. 7, the magnitude of the velocity component Vw of the wall 300 relative to the velocity V of the mobility device 100 can be denoted by Equation (3) below.

$$Vw = -V \cos(\theta - \Phi) \qquad (3)$$

From Equations (2) and (3) described above, the velocity component Vw of the wall 300 (point P) at the position of the distance L from the mobility device 100 can be denoted by Equation (4) below.

$$Vw = -V \cos\{\arcsin(D \cos \Phi / L) - \Phi\} \qquad (4)$$

The control unit 10 of the electronic device 1 may skip detection of the target by using the constant false alarm rate (CFAR) for the distance L and the velocity Vw obtained in the above manner. For example, the control unit 10 may exclude the distance L and the velocity Vw obtained in the above manner from processing of detecting a target by using the constant false alarm rate. In such a case, the control unit 10 may determine that the wall 300 is stationary. That is, in this case, the wall 300 is determined to be stationary relative to ground (road) on which the mobility device 100 travels.

As described above, in the one embodiment, the control unit 10 may estimate the relative velocity between the electronic device 1 and an object located around the electronic device 1 on the basis of the transmission signal and the reception signal. The control unit 10 may then determine whether the object located around the electronic device 1 is stationary on the basis of the relative velocity and the moving velocity of the electronic device 1.

In the above manner, the control unit 10 may determine whether an object, for example, the wall 300, located around the electronic device 1 is stationary. In this case, the control unit 10 may determine whether the object located around the electronic device 1 is stationary relative to an environment (for example, on the ground, on the water, or in a space) around the electronic device 1. The control unit 10 may also determine whether the object located around the electronic device 1 is a wall located around the electronic device 1. In this case, the control unit 10 may determine whether the object located around the electronic device 1 is a wall disposed to run parallel to the moving direction of the electronic device 1 just like the wall 300 illustrated in FIG. 7.

As described above, the wall 300 can be determined to be stationary by determining the distance D at which the relative velocity becomes equal to 0 km/h and the magnitude of the velocity vector Vw of the wall 300. Thus, the wall 300 can be excluded from the target detection processing. That is, the control unit 10 may skip processing of detecting a target by using the constant false alarm rate, for a detection point that is in a relationship of a relative velocity of an object determined to be stationary such as the wall 300. On the other hand, the control unit 10 may perform the processing of detecting a target by using the constant false alarm rate, for other points (points not determined to be stationary). The processing described above may be performed by, for example, the distance-velocity detection determining unit 13 in the control unit 10 illustrated in FIG. 2.

The distance-velocity detection determining unit 13 may supply, to the angle-of-arrival estimating unit 14, a complex signal of the distance and the relative velocity that exceed respective thresholds as a result of the detection using the constant false alarm rate. The angle-of-arrival estimating unit 14 may estimate an angle of arrival for the complex signal of the distance and the relative velocity that exceed the respective thresholds, that is, an angle of arrival of a reflected wave from the detected object. The object detecting unit 15 may perform detection of an object such as clustering, for example, on the basis of the obtained angle, distance, and relative velocity information. In this manner, the object detecting unit 15 may calculate the average power of the points constituting the object to determine whether to detect the object as a target.

As described above, in the electronic device 1 according to the one embodiment, the control unit 10 may perform control to skip processing of detecting an object determined to be a stationary object, among objects located around the electronic device 1, as a target by using the constant false alarm rate on the basis of a transmission signal and a reception signal. On the other hand, the control unit 10 may perform control to perform processing of detecting an object determined not to be a stationary object, among objects located around the electronic device 1, as a target by using the constant false alarm rate on the basis of a transmission signal and a reception signal.

Figure 10:
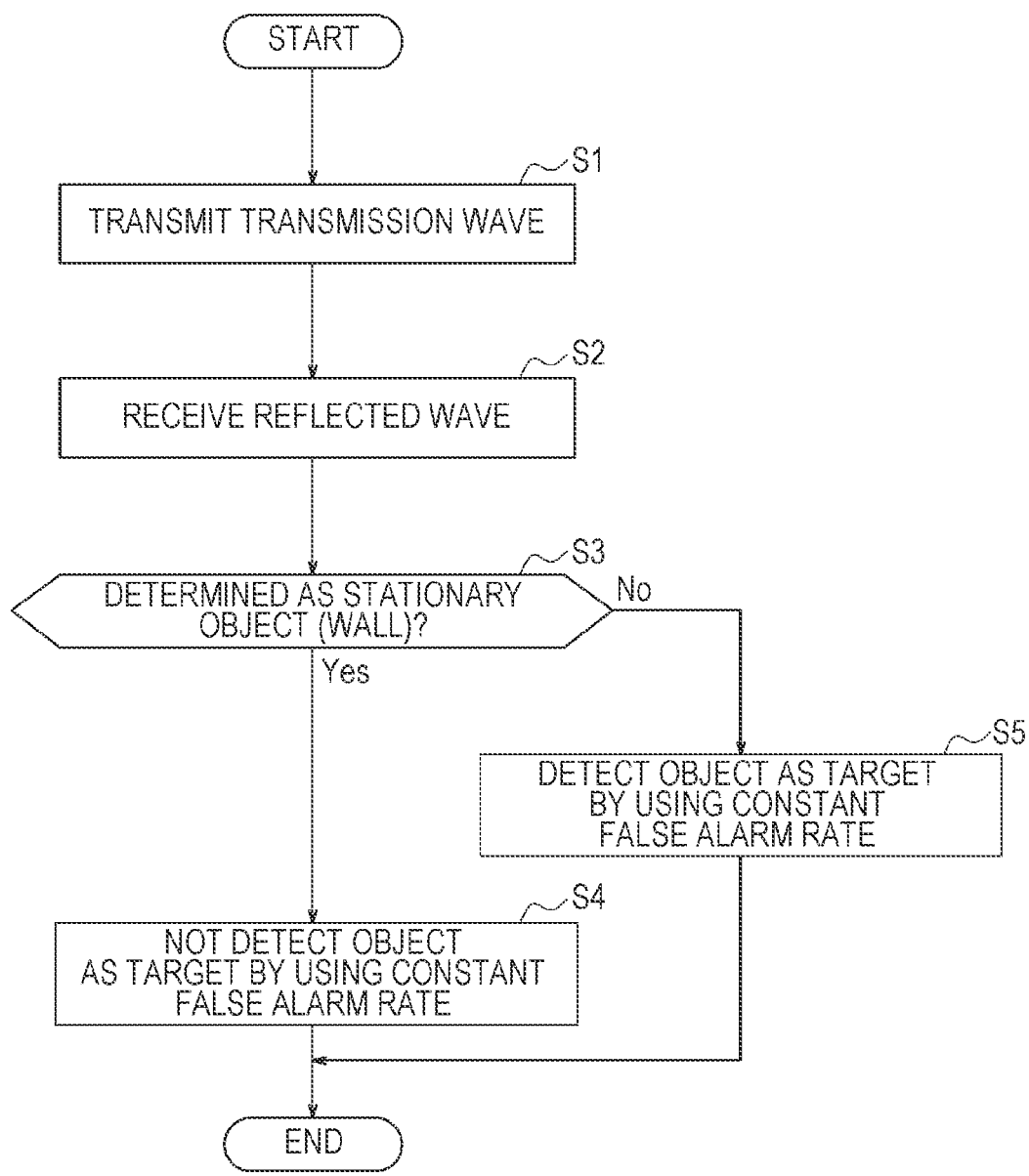
FIG. 10 is a flowchart for describing an operation of the electronic device according to the one embodiment.

FIG. 10 is a flowchart for describing an operation performed by the electronic device 1. A flow of the operation performed by the electronic device 1 is briefly described below. The operation illustrated in FIG. 10 may be started, for example, when the electronic device 1 mounted in the mobility device 100 performs detection of a moving object while skipping detection of a stationary object among objects located around the mobility device 100.

In response to the start of the processing illustrated FIG. 10, the control unit 10 performs control so that a transmission wave is transmitted from the transmission antenna 25 of the sensor 5 (step S1).

After the transmission wave is transmitted in step S1, the control unit 10 performs control so that a reflected wave that is the transmission wave reflected off an object is received from the reception antenna 31 of the sensor 5 (step S2).

After the reflected wave is received in step S2, the control unit 10 determines whether a detected point is a stationary object (for example, the wall 300) on the basis of the transmission wave and the reflected wave (step S3).

If it is determined in step S3 that the detected point is a stationary object, the control unit 10 performs control so that the object is not detected as the target by using the constant false alarm rate (step S4). In step S4, the control unit 10 may exclude the object from the processing of detecting the object as the target by using the constant false alarm rate.

On the other hand, if it is determined in step S3 that the detected point is not a stationary object, the control unit 10 performs control so that the object is detected as the target by using the constant false alarm rate (step S5). The operation illustrated in FIG. 10 may be performed repeatedly, for example, at predetermined timings or irregularly.

The electronic device 1 according to the one embodiment can skip detection of a stationary object and detect only a moving object as a target. For example, since detection of a stationary object is skipped, the distance-velocity detection determining unit 13 is no longer required to perform processing of detecting the target at a distance and a relative velocity of the object by using the constant false alarm rate. In addition, for example, since detection of a stationary object is skipped, the angle-of-arrival estimating unit 14 is no longer required to perform processing of estimating an angle of arrival of a reflected wave from the object. Further, for example, since detection of a stationary object is skipped, the object detecting unit 15 is no longer required to perform processing of detecting the object.

Thus, with the electronic device 1 according to the one embodiment, an electronic device capable of reducing the processing load of detecting a target can be provided. As described above, by reducing the processing load of detecting a target, the electronic device 1 can allocate resources of the control unit 10 to other processing, for example. In addition, by reducing the processing load of detecting a target, the electronic device 1 can reduce a processing capability of the control unit 10 required in detecting a moving object located around the electronic device 1 to some extent, for example.

In the description of the embodiment above, the example in which the stationary object is the wall 300 is presented. However, the stationary object 300 detected by the electronic device 1 of the present disclosure may be an object other than the wall. For example, the stationary object 300 detected by the electronic device 1 of the present disclosure may be any object located around the mobility device 100, such as a motorcycle, a bicycle, a stroller, a person such as a pedestrian, other forms of life such as an animal or an insect, a guardrail, a median strip, a road sign, a step on a sidewalk, a manhole, a structure such as a house, a building, or a bridge, or an obstacle. Further, the stationary object 300 may be an automobile or the like that is parked or stationary around the mobility device 100. In addition, the stationary object 300 may be located not only on a road but also at an appropriate place such as on a sidewalk, in a farm, on a farmland, in a parking lot, in a vacant lot, in a space on a road, in a store, at a crossing, on the water, in the air, in a gutter, in a river, in another mobility device, in a building, or inside or outside of other structures.

While the present disclosure has been described on the basis of the various drawings and the embodiments, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without any logical contradiction. A plurality of functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure on the basis of the present disclosure. Accordingly, these variations and corrections are within the scope of the present disclosure. For example, in each embodiment, each functional unit, each means, each step, or the like can be added to another embodiment or replaced with each functional unit, each means, each step, or the like in another embodiment without any logical contradiction. In each embodiment, a plurality of functional units, means, steps, or the like may be combined to one or may be divided. In addition, the embodiments according to the present disclosure described above are not limited to strict implementation according to the respective embodiments described above, and may be implemented by appropriately combining the features or omitting part thereof.

The embodiments described above are not limited to implementation as the electronic device 1. For example, the embodiments described above may be implemented as a method for controlling a device such as the electronic device 1. For example, the embodiments described above may be implemented as a program executed by a device such as the electronic device 1.

The electronic device 1 according to one embodiment may include, as the minimum configuration, at least part of only one of the sensor 5 or the control unit 10, for example. On the other hand, the electronic device 1 according to one embodiment may appropriately include at least any of the signal generating unit 21, the synthesizer 22, the phase control units 23, the amplifiers 24, and the transmission antennas 25 illustrated in FIG. 2 in addition to the control unit 10. In addition, the electronic device 1 according to the one embodiment may appropriately include at least any of the reception antenna 31, the LNA 32, the mixer 33, the IF unit 34, and the AD conversion unit 35 instead of or along with the functional units described above. Further, the electronic device 1 according to the one embodiment may include the storage unit 40. As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 and the reception antennas 31 may be installed outside the mobility device 100.

REFERENCE SIGNS LIST 1 electronic device
5 sensor
10 control unit
11 distance FFT processing unit
12 velocity FFT processing unit
13 distance-velocity detection determining unit
14 angle-of-arrival estimating unit
15 object detecting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU
100 mobility device
131 shift register
132 sorting unit
133 data selecting unit
134 threshold calculating unit
135 weight setting unit
136 detection determining unit
200 object
300 wall

The invention claimed is:

1. An electronic device comprising:
a transmission antenna that transmits a transmission wave;
a reception antenna that receives a reflected wave that is the transmission wave having been reflected; and
a control unit that detects a target by using a constant false alarm rate on the basis of a transmission signal transmitted as the transmission wave and a reception signal received as the reflected wave, wherein
the control unit performs control to skip processing of detecting an object determined to be a stationary object among objects located around the electronic device, as the target by using the constant false alarm rate on the basis of the transmission signal and the reception signal, and
the control unit performs control to skip processing of using the constant false alarm rate concerning a first object detected in a first distance L calculated by a following formula (1)

$$\theta = \arcsin(D/L \cdot \cos \phi) \tag{1}$$

wherein
a first angle $\theta$ is an angle between a first direction parallel to a moving direction in which a mobility device on which the transmission antenna is installed is moving and a direction from the moving direction to the first object,
a second angle $\phi$ is an angle between the first direction and a normal direction of a surface on which the transmission antenna is installed, and
a second distance D is a distance from the transmission antenna to a second object which exists in an extended direction parallel to the surface on which the transmission antenna is installed.

2. The electronic device according to claim 1, wherein the control unit determines whether an object located around the electronic device is stationary.

3. The electronic device according to claim 2, wherein the control unit determines whether the object located around the electronic device is stationary relative to an environment around the electronic device.

4. The electronic device according to claim 3, wherein the control unit determines whether the object located around the electronic device is a wall located around the electronic device.

5. The electronic device according to claim 4, wherein the control unit determines whether the object located around the electronic device is a wall disposed to run parallel to a moving direction of the electronic device.

6. The electronic device according to claim 2, wherein the control unit estimates a relative velocity between the electronic device and the object located around the electronic device on the basis of the transmission signal and the reception signal, and determines whether the object located around the electronic device is stationary on the basis of the relative velocity and a moving velocity of the electronic device.

7. The electronic device according to claim 1, wherein in a two-dimensional distribution of signal intensities based on the reception signal in a distance direction and a relative velocity direction, the control unit establishes reference regions in the distance direction and the relative velocity direction with respect to a test region, and sets a threshold for use in detection of the target on the basis of an order statistic among the signal intensities in the reference regions.

8. The electronic device according to claim 1, wherein the control unit performs control to perform processing of detecting an object determined not to be a stationary object among the objects located around the electronic device, as the target by using the constant false alarm rate on the basis of the transmission signal and the reception signal.

9. A method for controlling an electronic device, comprising:
a step of transmitting a transmission wave from a transmission antenna;
a step of receiving, from a reception antenna, a reflected wave that is the transmission wave having been reflected;
a step of detecting a target by using a constant false alarm rate on the basis of a transmission signal transmitted as the transmission wave and a reception signal received as the reflected wave, wherein control is performed to skip processing of detecting an object determined to be a stationary object among objects located around the electronic device, as the target by using the constant false alarm rate on the basis of the transmission signal and the reception signal; and
a step of performing control to skip processing of using the constant false alarm rate concerning a first object detected in a first distance L calculated by a following formula (1)

$$\theta = \arcsin(D/L \cdot \cos \phi) \qquad (1)$$

wherein
a first angle $\theta$ is an angle between a first direction parallel to a moving direction in which a mobility device on which the transmission antenna is installed is moving and a direction from the moving direction to the first object,
a second angle $\phi$ is an angle between the first direction and a normal direction of a surface on which the transmission antenna is installed, and
a second distance D is a distance from the transmission antenna to a second object which exists in an extended direction parallel to the surface on which the transmission antenna is installed.

10. A non-transitory computer-readable recording medium storing computer program instructions, which when executed by an electronic device, cause the electronic device to:
transmit a transmission wave from a transmission antenna;
receive, from a reception antenna, a reflected wave that is the transmission wave having been reflected;
detect a target by using a constant false alarm rate on the basis of a transmission signal transmitted as the transmission wave and a reception signal received as the reflected wave, wherein control is performed to skip processing of detecting an object determined to be a stationary object among objects located around the electronic device, as the target by using the constant false alarm rate on the basis of the transmission signal and the reception signal; and
perform control to skip processing of using the constant false alarm rate concerning a first object detected in a first distance L calculated by a following formula (1)

$$\theta = \arcsin(D/L \cdot \cos \phi) \qquad (1)$$

wherein
a first angle $\theta$ is an angle between a first direction parallel to a moving direction in which a mobility device on which the transmission antenna is installed is moving and a direction from the moving direction to the first object,
a second angle $\phi$ is an angle between the first direction and a normal direction of a surface on which the transmission antenna is installed, and
a second distance D is a distance from the transmission antenna to a second object which exists in an extended direction parallel to the surface on which the transmission antenna is installed.

11. The electronic device according to claim 1, wherein the control unit performs control to skip processing of using the constant false alarm rate concerning the first object when the first object has a relative velocity V1 calculated by a following formula (2)

$$V1 = V0 \cos(\theta - \phi) \qquad (2)$$

wherein
V0 is a moving velocity of the mobility device on which the transmission antenna is installed.

12. The method according to claim 9, wherein the step of performing control to skip processing of using the constant false alarm rate concerning the first object when the first object has a relative velocity V1 calculated by a following formula (2)

$$V1 = V0 \cos(\theta - \phi) \qquad (2)$$

wherein
V0 is a moving velocity of the mobility device on which the transmission antenna is installed.

13. The non-transitory computer-readable recording medium according to claim 10, wherein
the perform control to skip processing of using the constant false alarm rate concerning the first object when the first object has a relative velocity V1 calculated by a following formula (2)

$$V1 = V0 \cos(\theta - \phi) \qquad (2)$$

wherein
V0 is a moving velocity of the mobility device on which the transmission antenna is installed.

* * * * *